Feb. 22, 1944.                S. D. GEHMAN                2,342,577
                         VIBRATION ISOLATING MEANS
                            Filed Nov. 10, 1941
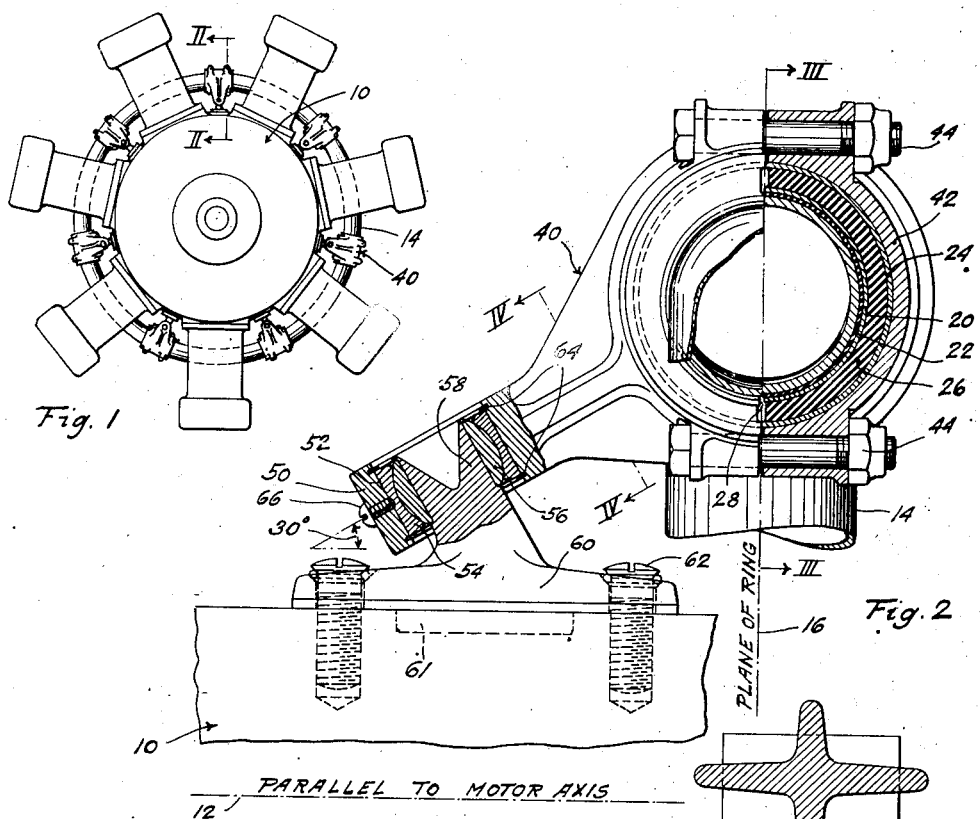
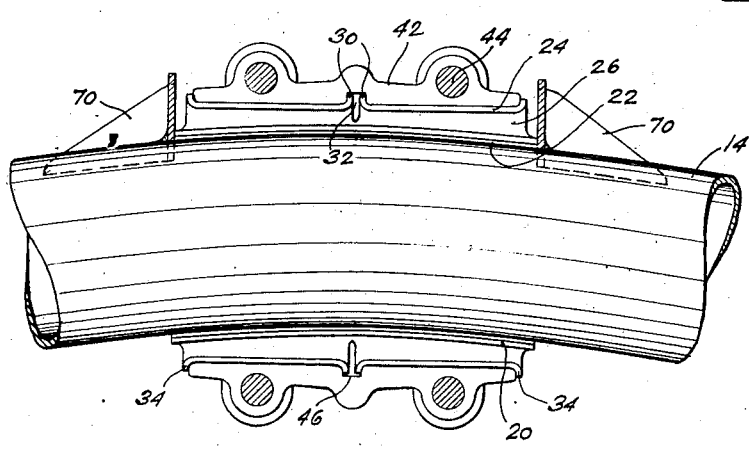
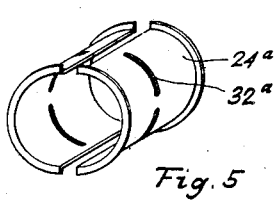
Inventor
Samuel D. Gehman Patented Feb. 22, 1944

2,342,577

UNITED STATES PATENT OFFICE 2,342,577

VIBRATION ISOLATING MEANS

Samuel D. Gehman, Akron, Ohio, assignor to Wingfoot Corporation, Akron, Ohio, a corporation of Delaware Application November 10, 1941, Serial No. 418,606

10 Claims. (Cl. 248—5)

This invention relates to vibration isolating means for mounting prime movers, and, more particularly, is concerned with a rubber mounting means adapted to secure a radial aircraft engine to a mounting ring.

Heretofore, various vibration isolating means, systems and methods have been suggested for mounting internal combustion engines in cars, trucks, buses, and the like, but these mounting means and methods are not adapted to support radial airplane engines on an airplane fuselage usually in an overhanging position. Therefore, a number of resilient supports have been proposed which are particularly adapted to mount airplane engines. However, many of these means and methods are open to the objection that a relatively large number of parts are required which are expensive to manufacture, assemble and install, and which are subject to breakage and other maintenance problems, such as lubrication. Furthermore, many of the motor mountings heretofore employed have not properly isolated the vibrations of the engine so that the vibrations are passed into the fuselage of the airplane or other aircraft. Again, substantially all motor mounting means for aircraft engines and adapted to mount an engine on a circular engine supporting ring, have not surrounded the engine mounting ring, but instead are secured to the side of the ring by welded-on brackets so that the expense of the complete assembly is increased and failure of the mounting means results in the engine breaking away from the mounting ring.

It is the general object of my invention to avoid and overcome the foregoing and other difficulties of and objections to known means and methods for mounting airplane engines in place by the provision of an improved means for mounting a prime mover, and specifically an aircraft engine on an aircraft, wherein the means involve a comparatively small number of parts which are relatively inexpensive to manufacture, install and maintain in operation, and whereby a maximum isolating action is achieved, and with a maximum of strength.

Another object of my invention is to provide a vibration isolating mounting for an airplane engine and characterized by strap brackets surrounding the engine mounting ring and including rubber bushings positioned between the mounting ring and the bracket straps.

Another object of my invention is the provision of a rubber engine mount of the character described and wherein the rubber incorporated in the mounting has suitable openings associated therewith into which the rubber can move when the rubber in the mounting is subjected to stress.

Another object of my invention is to provide an airplane engine mounting including a plurality of means positioned at circumferentially spaced points around the engine and connected thereto by universal joints, with the means extending at an angle to the axis of the motor to a position to completely surround the engine mounting ring and with rubber bushings positioned between the mounting ring and the mounting means.

The foregoing and other objects of my invention are achieved by the provision of a mounting for an aircraft engine comprising a mounting ring, an engine positioned offset from the ring but with the engine axis usually coincident with the axis of the ring, a plurality of brackets spaced circumferentially of the mounting ring and having portions surrounding the mounting ring, said brackets extending inwardly toward the motor substantially as elements of a cone frustum, ball and socket or other universal connections between the motor and the adjacent ends of the brackets, and rubber cushioning means between the portions of the brackets surrounding the mounting ring and the mounting ring.

For a better understanding of my invention reference should be had to the accompanying drawing wherein:

Fig. 1 is a front elevation of an engine mount embodying the principles of the invention and shown in association with an engine and an engine mounting ring;

Fig. 2 is a side elevation partly in section and on a larger scale of one of the mounting means shown in Fig. 1, and with those portions of the drawing shown in section being taken substantially on line II—II of Fig. 1;

Fig. 3 is a cross-sectional view taken on line III—III of Fig. 2;

Fig. 4 is a cross-sectional view taken on line IV—IV of Fig. 2; and

Fig. 5 is a perspective view, on a reduced scale, of a modification of the outer metal sleeve incorporated in the mounting.

Although the principles of my invention are broadly capable of use in mounting substantially any type of prime mover upon a base member and in a manner to isolate vibrations from the mounting, my invention is primarily concerned with the provision of a rubber engine mount adapted to connect an airplane engine in an overhanging position to a circular mounting ring forming a part of the airplane fuselage, and therefore has been so illustrated and will be so described.

In the drawing, the numeral 10 indicates generally an engine having its axis positioned substantially parallel to the construction line 12 (see Fig. 2) and extending perpendicularly through the center of a tubular and circular engine mounting ring 14 having a plane defined by the construction line 16. A plurality of engine mounts positioned at circumferentially spaced points around the ring 14 are employed to mount the engine on the ring, as will be evident from Fig. 1. Each engine mount includes an inner metal shell 20 having an internal diameter such as to clamp on the engine mounting ring 14, and with the shell 20 being of toroidal form, i. e. bent on an arc, substantially of the same radius as the radius of the engine mounting ring 14. Thus, the inner metal shell 20 of the engine mount is adapted to closely surround and engage with the engine mounting ring 14. To improve the frictional engagement between the inner metal shell 20 and the engine mounting ring 14 I usually provide a thin covering layer 22 of rubber upon the inner surface of the inner metal shell 20 which rubber is preferably vulcanized to the metal shell.

Associated with the inner metal shell 20 is an outer metal shell 24 of substantially cylindrical shape and having an inside diameter sufficiently greater than the outside diameter of the inner metal shell 20 so that a space is provided between the two shells. This space is substantially filled by a body of rubber 26 which is vulcanized to both the inner and outer metal shells. The inner metal shell 20 is somewhat longer than the outer metal shell 24 as best seen in Fig. 2, so that the two shells may have relative movement with relation to each other as hereinafter described.

The shells 20 and 24 and the rubber body 26 are split longitudinally substantially in the plane of the engine mounting ring 14. A clearance 28 is provided between the adjacent but separated edges of the inner shells 20 and the rubber, and it will be seen that the clearance between the rubber body is ordinarily greater than the clearance between the adjacent edges of the metal shell 20. The parts of the outer shells 24 preferably butt so as to allow a better clamping action against the shell. This clearance space 28 between adjacent portions of the rubber body provides a space into which the rubber body may flow when compressed between the inner and outer metal shells so that a greater resiliency and cushioning action is provided by the rubber body. Further, the outer metal shell 24 may be split centrally and transversely and formed with radially outwardly extending flanges 30 having a clearance 32 therebetween. The clearance 32 also provides a space into which the rubber body 26 may flow when under compression to thereby increase the resiliency of the rubber body and to cause every portion of the body to flow under compression rather than concentrating the rubber flow only at the ends of the mounting. The outermost ends of the outer shell 24 are formed with radially outwardly directed flanges 34 so as to provide for a more positive clamping of a supporting link or strap thereto.

Associated with the means already described is a bracket or strap, indicated as a whole by the numeral 40, and having a hanger portion 42 associated therewith which is adapted to closely surround and engage with the outer metal shell 24. The strap or hanger 42 is split, usually in the plane of the mounting ring 14, so that it comprises two parts which are removably secured together by a plurality of bolts 44 which serve to clamp the hanger or strap portion 42 tightly around the periphery of the outer metal shell 24. The length of the hanger portion 42 is such that the flanges 34 of the outer metal shell 24 engage closely with the ends of the hanger. The hanger portion 42 is suitably grooved as at 46 to receive the flanges 30 formed at the center of the outer metal shell 24.

As shown in Fig. 2 of the drawing, the axis of each bracket 40 is positioned at an angle of approximately 30° with respect to the axis of the engine 10 being mounted. Thus, the several brackets are positioned as elements of a conical frustum. Each bracket 40 has an integral eye 50 including a bore 52 which slidably receives a socket member 54, usually formed in two halves, and preferably made from relatively tough and hard plastic so that lubrication is unnecessary. The socket member 54 is adapted to closely fit and surround a ball 56 secured over the outer end of a post or stud 58 adapted to be positioned substantially in alignment with the axis of the eye 50 and having a flanged base 60 connected in any suitable manner, as for example, by screws 62 to the motor 10. The socket member 54 is held in the bore 52 of the eye 50 by a pair of snap-in locking rings 64 which are received in suitable groves in the bore.

In mounting an engine on the mounting ring it wil sometimes be found that the engine mounting ring 14 is not absolutely or accurately flat, or it may be found that the mounting holes in the engine for the stud flange 60 or the stud flange boss 61 are not exactly aligned with the holes in the flange or the boss thereon. In any event, it is convenient to provide a suitable adjustment for the length of the bracket 40, and to this end the socket member 54 may have its socket positioned eccentric of its outer periphery so that by relatively rotating the socket member 54 in the eye 50 the effective length of the bracket 40, as well as its lateral relation to the engine 10 can be quickly adjusted. A locking screw 66 associated with the eye 50 can be provided to lock the socket member 54 in any adjusted eccentric position. The clearances between the ends of the two part socket member 54 facilitate the insertion of a tool in the socket member and its rotation.

I further contemplate forming the bore 52 in the eye 50 as a blind bore, that is the bore 52 will be drilled upwardly through the eye to a point near the upper end of the eye so as to form a cup rather than a bore in the eye. This provides a closed end to the bore so that entrance of dirt into the ball and socket joint is largely prevented, and provides increased strength at the bore.

In Fig. 5 I have illustrated a modification of the outer metal shell 24. Specifically, the modified outer metal shell 24a of Fig. 5 does not include the transverse centrally positioned split, and thus it is unnecessary to form the groove 46 in the hanger portion 42 of the bracket 40. However, the tube 24a is slotted transversely adjacent its center so as to provide openings 32a into which the rubber body 26 may flow during the compression thereof.

Lugs 70 welded or otherwise secured to the outer periphery of the engine mounting ring 14 adjacent the ends of the inner metal shell 20 engage with the ends of the metal shell and prevent circumferential displacement thereof with respect to the engine mounting ring 14.

From the foregoing it will be recognized that the objects of my invention have been achieved by the provision of a relatively simple, strong, and particularly practical mounting means for aircraft engines. The mounting means include rubber bushings directly surrounding the engine mounting ring and thereby giving a very high strength and a direct support to the whole engine mounting assembly. The engine mounting means include universal connections to the engine and a rubber cushion connection to the engine mounting ring which provides torque isolating, tilt or angular isolating and axial isolating action. The rubber cushioning bodies incorporated in the mounting are adapted to have a particularly resilient cushioning action because of the spaces provided into which the rubber may flow during compression thereof.

More specifically, by increasing or decreasing the size or number of the clearance spaces provided and into which the rubber may flow during radial stress, I am able to provide an engine mounting unit having substantially the exact type of isolating action required for any given installation. Further, it should be noted that in the usual practice of my invention the rubber body 26 is ordinarily vulcanized to have a thickness of 5 to 20 per cent, and usually about 10 per cent greater than the thickness of the rubber body after it is clamped within the hanger portion 42. Thus, the rubber body 26 can be put and held under any desired degree of initial compression, if this be found advisable.

The universal connections at the engine introduce additional flexibility into the mounting, facilitate the mounting of the engine, and reduce the possibility of vibration fatigue failures such as would tend to occur in rigid connections at this point.

It might be noted that in the operation of the vibration isolating means that the ball and socket or other universal pivoting means connecting the bracket 40 with the engine acts to absorb or isolate the torque with a rocking action which places the rubber body 26 in tension on one side of one end and in compression on the other side of the same end and vice versa on the other end of the rubber body. In other words, the rubber body is not subjected to shear (such as would occur if the bracket 40 were rigidly secured to the engine) but, instead, the rubber body itself acts as a second pivot in the mounting. Thus, two diagonally opposite zones of the rubber body are stressed in tension, and the other two diagonally opposite zones are stressed in compression.

While in accordance with the patent statutes I have particularly illustrated and described my invention, it should be clearly understood that I am not to be limited thereto or thereby, but that the scope of my invention is defined in the appended claims.

I claim:

1. In combination in a mounting for an aircraft engine, an engine mounting ring, an engine positioned offset from the ring but with the engine and ring axes substantially coincident, a plurality of brackets spaced circumferentially of the mounting ring and having hanger portions surrounding the mounting ring, said brackets extending inwardly toward the engine substantially as elements of a cone frustum, universal connections between the engine and the adjacent ends of the brackets, and a rubber cushioning means between each hanger portion of the brackets and the mounting ring and surrounding the mounting ring.

2. In combination in a mounting for an aircraft engine, an engine mounting ring, an engine positioned with its axis extending axially of the ring, a plurality of brackets spaced circumferentially of the mounting ring and having hanger portions surrounding the mounting ring, said brackets extending inwardly toward the engine, ball and socket connections between the engine and the adjacent ends of the brackets, and a rubber cushioning means between each hanger portion of the brackets and the mounting ring and substantially surrounding the mounting ring.

3. In combination in a mounting for an aircraft engine, an engine mounting ring, an engine positioned adjacent the ring, a plurality of brackets spaced circumferentially of the mounting ring and having hanger portions surrounding the mounting ring, rubber cushioning means under initial compression and positioned between the hanger portion of each bracket and the mounting ring, and ball and socket means connecting the brackets to the engine.

4. A vibration isolating mounting adapted to connect an aircraft engine with a mounting ring and comprising an inner toroidal metal shell bent longitudinally to form an arc of the same radius as the arc of the engine mounting ring and having an inner cross-sectional diameter such as to clamp on the outer cross-sectional diameter of the engine mounting ring, a thin coating of rubber on the inner surface of the shell, a substantially cylindrical outer metal shell surrounding the inner metal shell in spaced relation thereto, a body of rubber vulcanized between the shells, said shells and rubber being separated longitudinally substantially in the plane of the mounting ring and having a clearance between the separated edges of the shells and a greater clearance between the separated edges of the rubber, said outer metal shell being split transversely centrally thereof and spaced apart in the region of the split so that the rubber body may flow therethrough, and a bracket strap removably clamped around the outer metal shell and having a portion adapted to have a ball and socket connection with an aircraft engine.

5. A vibration isolating mounting adapted to connect an engine with a mounting ring and comprising an inner metal shell forming an arc of substantially the same radius as the mounting ring and having an inner diameter so as to clamp against the outer periphery of the mounting ring, a substantially cylindrical outer metal shell surrounding the inner metal shell in spaced relation thereto, a body of rubber positioned between the shells, said shells and rubber being separated longitudinally substantially in the plane of the mounting ring and having a clearance between the separated edges of the shells and a greater clearance between the separated edges of the rubber, said outer metal shell being cut away transversely and centrally thereof so that the rubber body may flow therethrough, and a bracket strap removably clamped around the outer metal shell and having a portion adapted to have a connection with an engine.

6. A vibration isolating mounting adapted to connect an engine with a mounting ring and comprising an inner metal shell forming an arc of substantially the same radius as the mounting ring and having an inner diameter so as to clamp against the outer periphery of the mounting ring, a substantially cylindrical outer metal shell surrounding the inner metal shell in spaced relation thereto, a body of rubber positioned between the shells, said rubber being separated longitudinally substantially in the plane of the mounting ring and having a clearance between the separated edges of the rubber, and a bracket strap removably clamped around the outer metal shell and having a portion adapted to have a connection with an engine.

7. A vibration isolating mounting adapted to connected an engine with a mounting ring and comprising a toroidal inner metal shell forming an arc of substantially the same radius as the mounting ring and having an inner diameter so as to clamp against the outer periphery of the mounting ring, a substantially cylindrical outer metal shell surrounding the inner metal shell in spaced relation thereto, a body of rubber positioned between the shells, said shells and rubber being separated longitudinally substantially in the plane of the mounting ring, and a bracket strap removably clamped around the outer metal shell and having a portion adapted to have a connection with an engine.

8. A vibration isolating mounting adapted to connect an engine with a mounting ring and comprising an inner metal shell forming an arc of substantially the same radius as the mounting ring and having an inner diameter so as to clamp around the outer periphery of the mounting ring, a substantially cylindrical outer metal shell surrounding the inner metal shell in spaced relation thereto, a body of rubber positioned between the shells, said shells and rubber being separated longitudinally into a plurality of parts and a bracket strap removably clamped around the outer metal shell and having a portion adapted to have a connection with an engine.

9. A vibration isolating mounting adapted to mount a body on a mounting ring and comprising an inner metal shell, a layer of rubber on the inside of the shell, said shell having an inner diameter of a size so that the shell will clamp around the mounting ring, an outer metal shell surrounding the inner metal shell in spaced relation thereto, a body of rubber positioned between the shells, said shells and rubber being split longitudinally, and a bracket strap removably clamped around the outer metal shell and having a portion adapted to have a ball and socket connection with the body.

10. In combination, circularly positioned mounting means, a body positioned axially of the mounting means, a plurality of brackets spaced circumferentially of the mounting means, means connecting the body with universal pivots to the adjacent ends of the brackets, and a rubber cushioning means connecting the other ends of the brackets to the mounting means so that torque applied to the body stresses rubber cushioning means in two zones in shear and tension and in two zones in shear and compression.

SAMUEL D. GEHMAN.